June 15, 1954
C. L. METZLER ET AL
2,681,185
TAPE DISPENSING DEVICE
Filed Aug. 16, 1950
2 Sheets-Sheet 2
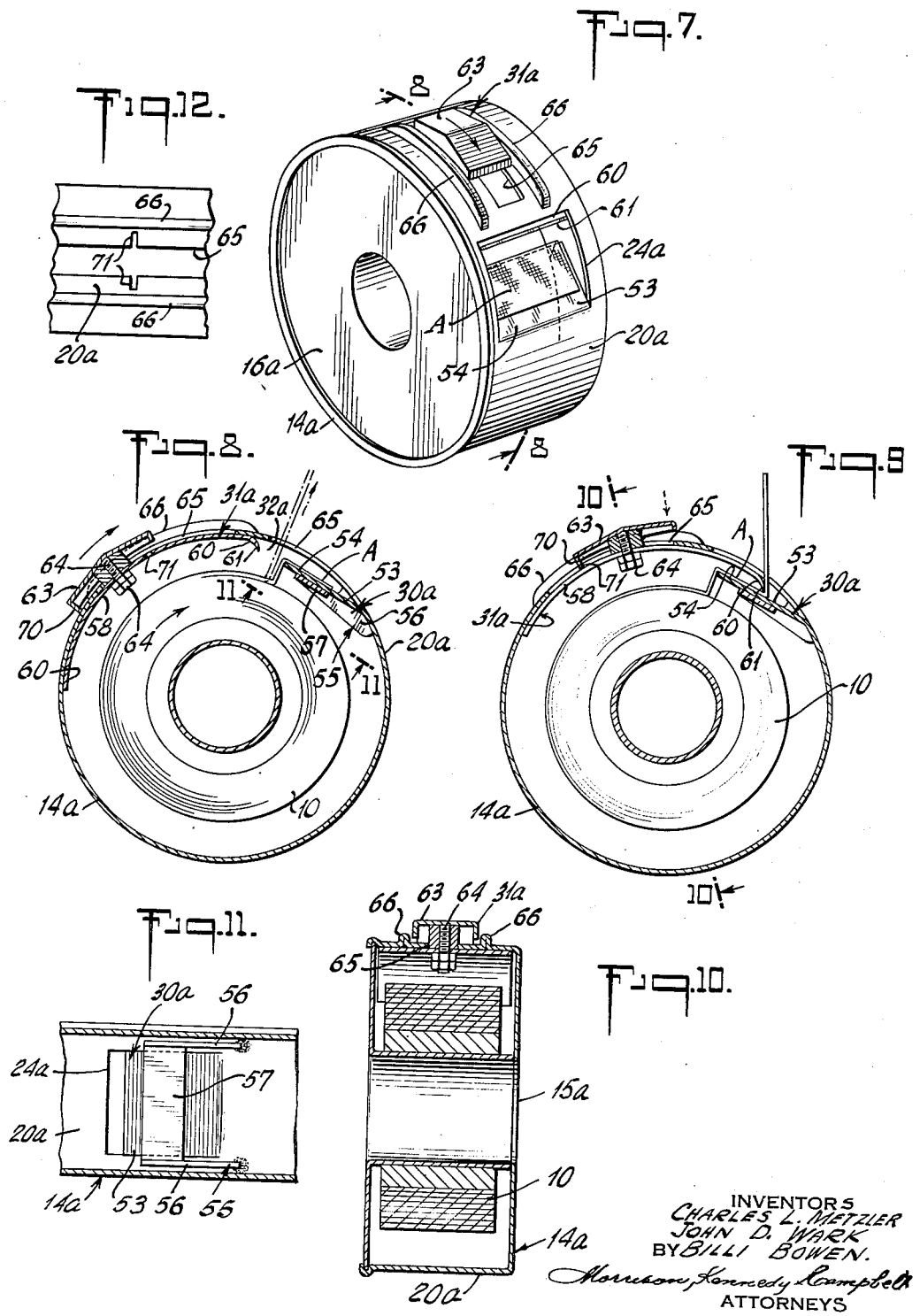
INVENTORS
CHARLES L. METZLER
JOHN D. WARK
BY BILLI BOWEN.
Morrison, Kennedy Campbell
ATTORNEYS Patented June 15, 1954

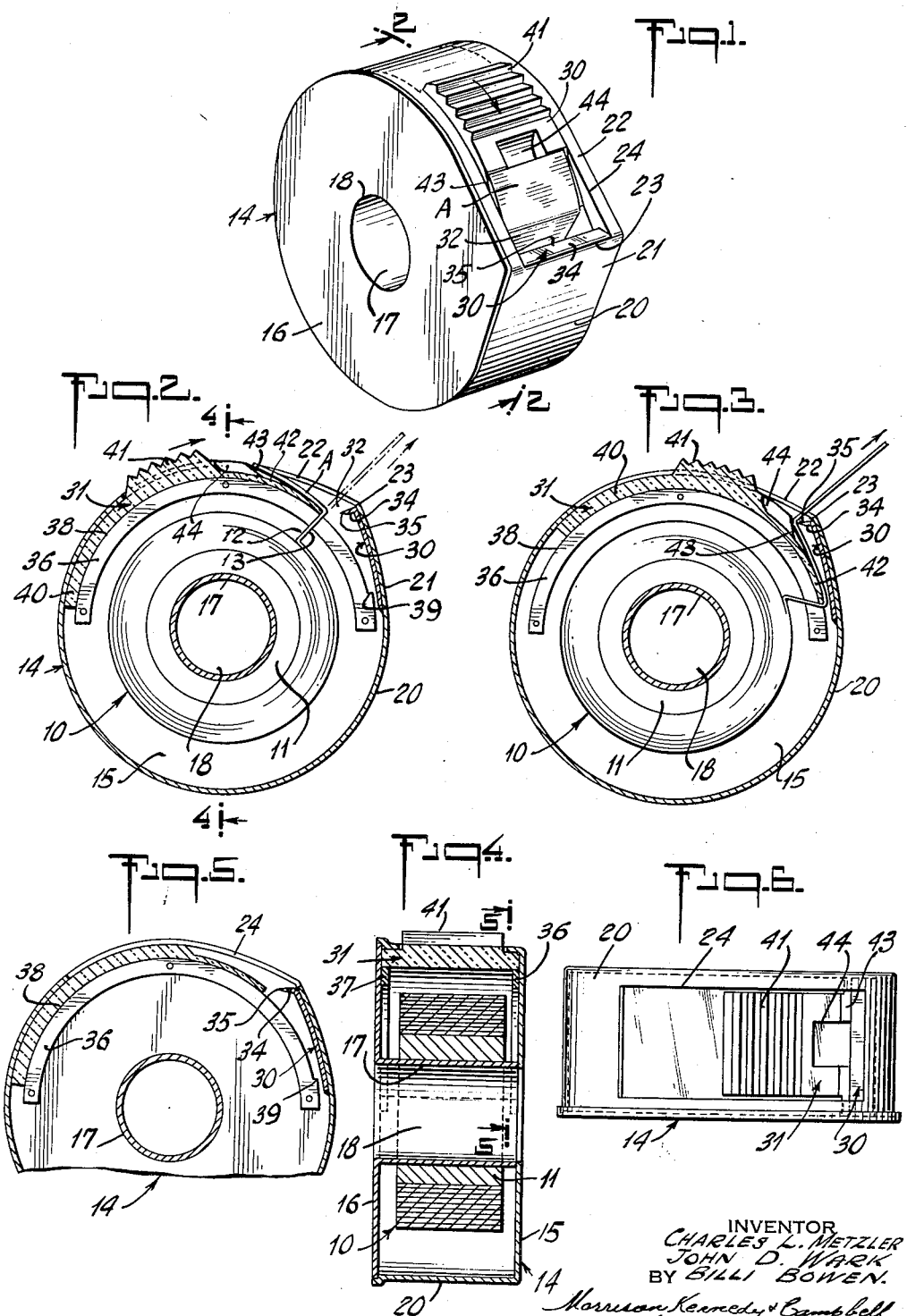

2,681,185

UNITED STATES PATENT OFFICE 2,681,185

TAPE DISPENSING DEVICE

Charles L. Metzler, Palisades Park, N. J., and John D. Wark, Freeport, and Billi Bowen, New York, N. Y., assignors to Johnson & Johnson, New Brunswick, N. J., a corporation of New Jersey Application August 16, 1950, Serial No. 179,694

15 Claims. (Cl. 242—55.5)

The present invention relates to a tape dispensing device and more particularly to a device for dispensing adhesive plaster tape of the type used for dressing wounds, etc.

The ordinary adhesive plaster tape is difficult to handle for dispensing purposes because of the necessity of maintaining it clean and sanitary, and because of the adhesive thereon making the handling thereof messy. Moreover, the ordinary plaster tape of this type has a heavy cloth backing, making it comparatively strong and difficult to tear cleanly.

One object of the present invention is to provide a new and improved adhesive tape dispensing device, which is constructed to maintain the tape roll or pack effectively housed and protected against contamination, which is operable to dispense and sever tape sections of selected length, quickly, cleanly and with minimum of effort and with minimum of fingering of the tape or the tape pack, which is operable to dispense tape safely without the possibility of accidentally pinching or cutting the manipulating fingers or hand, and which is comparatively inexpensive to manufacture, so that when the tape roll or pack has been spent, it is economical to throw away the dispensing device.

Various other objects are apparent from the following particular description and from an inspection of the accompanying drawings, in which:

Fig. 1 is a perspective of one form of tape dispensing device embodying the present invention and shown in open position in preparation for a dispensing operation;

Fig. 2 is a section of the tape dispensing device taken on line 2—2 of Fig. 1;

Fig. 3 is a section of the tape dispensing device similar to that of Fig. 2, but shown in closed position in preparation for the severance of the unreeled section of the tape;

Fig. 4 is a radial section of the tape dispensing device taken on lines 4—4 of Fig. 2;

Fig. 5 is a partial section of the tape dispensing device taken on lines 5—5 of Fig. 4;

Fig. 6 is a top plan view of the tape dispensing device shown in closed position corresponding to that shown in Fig. 3;

Fig. 7 is a perspective of another form of tape dispensing device embodying the present invention and shown in open position;

Fig. 8 is a section of the tape dispensing device taken on lines 8—8 of Fig. 7;

Fig. 9 is a section of the tape dispensing device similar to that of Fig. 8, but shown in closed position;

Fig. 10 is a section of the tape dispensing device taken on lines 10—10 of Fig. 9;

Fig. 11 is a detail section taken on lines 11—11 of Fig. 8; and

Fig. 12 is a fragmentary top plan view of the housing for the tape dispensing device of Fig. 7.

Referring to Figs. 1-6 of the drawings, the device of the present invention is shown in connection with a spool 10 of adhesive plaster tape wound around a core or hub 11 as a roll with the gum or adhesive side 12 of the tape facing radially inwardly and the fabric side 13 facing radially outwardly.

The tape dispensing device comprises a frame 14 supporting the spool 10 for free rotation. This frame 14 is desirably in the form of a housing having opposed end walls 15 and 16, the wall 16 having a central cylindrical flange 17 integral therewith as shown or otherwise secured thereto. This flange 17 extends axially inwardly of the housing 14 to the end housing wall 15 to form an axle for the spool 10 and to define a finger hole 18 by which the device may be conveniently held in an operator's hand for dispensing manipulation.

The end housing wall 15 has a peripheral flange 20 integral therewith as shown or otherwise secured thereto to define a peripheral housing wall and affixed to the other end housing wall 16, as by crimping, welding or soldering to form a rigid housing. The tape spool 10 is supported in this housing 14 with its hub 11 embracing the axle 17 for free rotation thereabout.

The end housing walls 15 and 16 are ovate orbicular in shape to provide the necessary space in the housing 14 for the tape holding mechanism to be described and the peripheral housing wall 20 is correspondingly shaped to define substantially flat tangential sections 21 and 22 tapering towards an apex 23. The peripheral wall section 21 is provided with a substantially rectangular dispensing opening 24 which extends to the wall apex 23 and through which the end unreeled section of the tape extends, as it is pulled off the spool 10.

Mounted near the opposite ends of the dispensing opening 24 of the housing 14 is a pair of opposed jaws or tape holding members 30 and 31 adapted to hold the payed out section of the tape against endwise movement, while it is being severed transversely and defining therebetween a discharge mouth 32 for the tape as it is being dispensed. One of these jaws 30 is affixed to the housing 14 and is shown in the general form of an angle piece secured to the underside of the peripheral housing wall section 22, as by soldering or welding and having a short flange 34 near the apex 23 of the peripheral housing wall 20 at the edge of the dispensing opening 24 extending substantially radially inwardly of the housing 14 to define a blade. This blade 34 terminates in a tapering edge 35 against which the payed section of the tape is held and along which it is ripped transversely by a tearing manipulation of the operator. This tear edge 35 need not be sharp and is effective for tape tearing purposes even if dull, because of the features to be described by which the tape is held against endwise movement, while it is being pulled against said jaw, and because the tape severing action is not a cutting action but a tearing action.

The other jaw 31 in the form of a slide is supported on the housing 14 for movement along the dispensing opening 24 towards and away from the fixed jaw 30 to open and close the discharge mouth 32. This slidable jaw 31 is of generally arcuate shape and is guided and supported on a pair of opposed arcuate rails 36 and 37 secured to the inner faces of the end housing walls 15 and 16 respectively near their outer peripheries, as by welding, soldering or riveting and defining runways 38 concentric with the axle 17. A tail 40 on the slidable jaw 31 fits with a slide fit between the circular section of the peripheral housing wall 20 and the rails 36 and 37 and a raised part 41 of the jaw 31 extends through the dispensing opening 24 and is knurled to define a thumb piece. This thumb piece 41 in open position of the slidable jaw 31 engages one edge of the dispensing opening 24 as shown in Fig. 2 and serves thereby as a means for limiting the opening movement of the jaw 31. The closing movement of the slidable jaw 31 is limited by the fixed edged jaw 30, as will be made apparent. Limiting shoulders 39 on the rails 36 and 37 for the forward edge of the jaw 31 may be provided as a positive stop to assure against the jamming of said jaw in tape holding position by excessive thumb pressure.

The head end 42 of the slidable jaw 31 is guided and supported on the rails 36 and 37 and serves as a table to receive the tape in a manner to be described. A ramp or wedge surface 43 on this table 42 cooperates with the tear edge 35 of the fixed jaw 30 in holding the unreeled section of the tape against endwise movement during tape ripping action.

In tape clamping position of the slidable jaw 31, the forward or table section 42 of said jaw 31 extends past the tape tearing edge 35 of the fixed jaw 30, so that a section A of the tape inwardly of its line of severance lies on said table section as shown in Fig. 3. This tape section A adheres to the table 42 after the payed out section of the tape has been severed and after the jaw 31 has been slid back into open position shown in Fig. 2 and serves as an easily accessible tab by which the end of the tape may be lifted into the dot and dash line position shown in Fig. 2 in preparation for the next tape dispensing operation. To assist in lifting the tab section A of the tape from the table 42, said surface has a depression 44. In tape clamping position of the slidable jaw 31 shown in Fig. 3, the tearing edge 35 of the fixed jaw 30 extends across this depression 44, so that the end portion of the tab section A of the tape after severance extends over said depression.

The slidable jaw 31 may be made of any suitable material, but is desirably made in one molded piece of plastic and is desirably transparent, so that the tail end 40 of said jaw, in closed position of said jaw shown in Figs. 3 and 6 may serve as a window by which the state of fullness of the spool 10 may be observed.

In the operation of the dispensing device, this device is palmed in one hand with the middle finger of said hand extending into the hollow of the axle 17 and the thumb on said hand engaging the thumb piece 41 of the slidable jaw 31. This jaw 31 is slid back into open position shown in Fig. 3 by the thumb of one hand and the end section A of the tape is lifted from the table 42 by the other hand into the substantially radial position shown in dot and dash lines in Fig. 2. In this lifted position of the end section A of the tape, this tape is pulled lengthwise through the jaw mouth 32, until the desired length of tape to be dispensed has been payed out. During this operation, the tape is peeled off and unreeled from the spool 10, and this spool is consequently rotated. When the required amount of tape has been pulled out, the jaw 31 through manipulation of the thumb is moved towards the fixed jaw 30, until the tape is clamped between the tear edge 35 and the ramp surface 43 of the two jaws as shown in Fig. 3. The clamping action of the jaws 30 and 31 on the tape assisted by the adhesive grip of the tape on table 42 of the slidable jaw 31 and by the sharp folding of the tape around the forward edge of said jaw 31 and around the tearing edge 35 holds the tape firmly against endwise movement, while it is being ripped along said edge. This tape ripping action is effected by the simple operation of pulling the tape along the tearing edge 35.

In view of the depression 44 in the slidable jaw 31, this jaw only presses the sides of the tape against the tear edge 35. However, this tape clamping action is at the region where it is most desirable, since the side of the tape which is initially ripped bears the greatest pull and has the greatest tendency to stretch during tape severing action. The clamping at the side of the tape where the tear is to be initiated assures a clean initial tear. The rest of the tape will be cleanly ripped transversely along the tear edge 35, even though the tape is not pressed against said edge by the slidable jaw 31 in the area over the depression 44.

It is seen that the dispensing device not only holds the tape spool 10 sanitarily protected in the housing 14 against contamination, but also permits dispensation of the tape with the minimum of fingering of the section of the tape being dispensed and without fingering the spool itself. Also, the jaws 30 and 31 protectively operate inside the housing 14, so that the possibility of accidentally pinching or cutting the fingers of the operator therebetween is avoided.

In the form of the invention shown in Figs. 7–12, the dispensing device comprises a housing 14a similar to the housing 14 in the construction of Figs. 1–6, except that the end walls 15a and 16a and the peripheral wall 20a of said housing 14a are entirely circular. This peripheral wall 20a has a dispensing opening 24a through which the end unreeled section of the tape extends as it is pulled off the spool 10.

Mounted on the housing 14a is a pair of opposed jaws or tape holding members 30a and 31a adapted to hold the payed out section of the tape against endwise movement while it is being severed transversely and defining therebetween a discharge mouth 32a for the tape as it is being dispensed.

One of the jaws 30a is affixed to the housing 14a and comprises a table 53 in the form of a tongue cut out of the peripheral housing wall 20a to define the dispensing opening 24a and extending therefrom inwardly of the housing 14a at an acute angle with respect to the tangent of said wall at the supported or base end of said tongue, to define an inclined wedge surface 54 for cooperation with the jaw 31a. This table 53 is firmly supported against hinge movement about its base by means of a bracket 55 comprising side arms 56 welded, soldered or otherwise fastened to the inner face of the peripheral housing wall 20a and a cross-piece 57 secured to and spanning said arms and serving as a seat for said tongue 53.

The other jaw 31a in the form of a slide is edged for tape clamping cooperation with the fixed jaw 30a and is supported for movement towards and away from said fixed jaw 30a to open and close the discharge mouth 32a. This slidable jaw 31a comprises a spring plate 58 in the general form of an angle piece having a section 60 flexed by the peripheral housing wall 20a into conforming engagement with the inner face of said housing wall 20a and a short flange 60 at one end extending inwardly of the housing 14a to define a blade. This blade 60 terminates in a tapering tear edge 61 against which the tape is held as it is ripped transversely by a tearing manipulation of the operator.

For guiding and supporting the slidable jaw 31a, said jaw carries a thumb piece 63 seated on the outer surface of the peripheral housing wall 20a and secured to the plate 58 by fastening means 64 extending through an elongated circumferential guide slot 65 in said housing wall and engaging the end of said slot in limiting open position of said jaw 31a shown in Fig. 8. This thumb piece 63 is shown of double slope construction, to facilitate rocking manipulation thereof, for the purpose to be described, and is retained for slide movement along the peripheral housing wall 20a snugly between two circumferential guide flanges 66 formed, as for example by the crimping or folding of the wall material.

The slidable jaw 31a has releasable means for automatically locking it against withdrawal when in tape tearing position. This locking means comprises a tail 70 on the rear end of the thumb piece 63 bearing against the peripheral housing wall 20a and thereby tilting the thumb piece clockwise (Fig. 8) against the action of the spring plate 58. This tail 70 is adapted to snap into a cross-slot 71 in the peripheral housing wall 20a when the slidable jaw 31a reaches tape tearing position shown in Fig. 9. This locks the slidable jaw 31a against withdrawal, so that the tearing of the tape along the tear edge 61 can be effected without the necessity of applying finger resisting pressure to the thumb piece 63. For releasing the slidable jaw 31a, the thumb piece 63 is rocked clockwise (Fig. 9) by application of downward pressure of the forward sloping side of said thumb piece against the action of the spring plate 58. This raises the tail 70 on the thumb piece 63 out of the cross-slot 71 and permits the slidable jaw 31a to be withdrawn to the inactive position shown in Fig. 8. The locking device described thereby acts as a spring latch.

In operation, the jaw 31a is moved towards the jaw 30a in a general direction substantially lengthwise of the table surface 54 of the jaw 30a. Consequently, as the two jaws 30a and 31a come together, the tape tear edge 61 of the jaw 31a rides over the table surface 54 of the jaw 30a until the tape is held between said jaws. In this position the slidable jaw 31a will be locked as described.

While the tape is clamped in position shown in Fig. 9 for severance, the end section A of the tape inwardly of the line of severance lies on the table surface 54 of the fixed jaw 30a. This tape section A adheres to this table surface 54 after the payed out section of the tape has been severed and after the jaw 31a has been slid back into open position shown in Fig. 8 and serves as a tab by which the end of the tape may be lifted into the dot and dash line position shown in preparation for unreeling operations. The spool 10 is mounted in the housing 14a in position reversed from that of the spool in the construction of Figs. 1–6, so that the tape as it is being pulled out substantially radially from the tape roll has its adhesive side facing the fixed table jaw 30a, as shown in dot and dash lines in Fig. 8.

In the operation of the dispensing device shown in Figs. 7–12, while the device is held in one hand in the manner described in connection with the construction of Figs. 1–6 and the jaw 31a is held back into open limiting position shown in Fig. 8 by the thumb of said hand, the tape is pulled out by the other hand through the discharge mouth 32a. When a desired length of tape has been pulled out, the jaw 31a is slid towards the fixed jaw 30a. During this operation, the edge 61 of the slidable jaw 31a engages the taut tape and folds it over the table surface 54 of the fixed jaw 30a, until the tape is firmly held in position shown in Fig. 9. A tearing manipulation of the tape along the edge 61 of the jaw 31a, rips the tape along this edge, while the end section A of the tape left in the housing 14a remains on the table surface 54 of the fixed jaw 30a in easily accessible position to be lifted for the next dispensing operation.

In the form of the invention shown in Figs. 1–6, the jaws 30 and 31 have been described as clamping the tape therebetween in closed position of the slidable jaw 31. Similarly in the form shown in Figs. 7–12, the jaws 30a and 31a have been described as performing a similar clamping operation on the tape. Such tape clamping action is desirable, but as far as certain aspects of the invention are concerned, the opposed jaws need only hold the tape therebetween against lengthwise movement during severing action, and the adhesive attachment of the tape to the table, and the friction hold of the tape resulting from its sharp turns around the edges of the jaws may be sufficient for the purpose, especially where the tape is not so strong and therefore is comparatively easy to tear. Under these conditions, the opposed jaws need come only close enough together to assure the laying of the tape over the table surface.

While the invention has been described with particular reference to specific embodiments, it is to be understood that it is not to be limited thereto, but is to be construed broadly and restricted solely by the scope of the appended claims.

What is claimed is:

1. A dispensing device for a tape roll comprising means for supporting the roll for rotation, a movable jaw with a tape severing edge facing radially inwardly with respect to the roll and in position to engage the tape as it is unreeled from said roll, a tape holding jaw opposite said jaw edge, said jaws defining therebetween a discharge mouth for the section of the tape to be dispensed, one of said jaws having a tape holding surface on the radially inner side of said tape severing edge facing radially outwardly and inclined with respect to the path of movement of said movable jaw in a direction to cause the tape to be wedged between said jaws, when the jaws are moved relatively towards each other into tape holding position, and co-operating means associated with both jaws for predetermining their tape holding positions.

2. A portable dispensing device for a roll of adhesive tape, comprising a housing having opposed end walls and an outer peripheral wall with a tape dispensing opening, means for supporting the tape roll in said housing for rotation about an axis extending between said end walls, a pair of opposed tape holding jaws on opposite sides of the path of the unreeled tape passing through said opening, one of said jaws having a blade extending inwardly towards the interior of said housing and terminating in a tape severing edge protectively located within the confines of the general outline of said peripheral wall, the other jaw presenting a tape holding table surface on the inner side of said edge facing outwardly with respect to said housing, one of said jaws being fixed to said housing near one end of said opening, the other jaw being slidably supported in said housing near the other end of said opening for movement along said peripheral housing wall towards and away from said fixed jaw, a finger piece connected to said slidable jaw and positioned on the outside of said peripheral housing wall in accessible position for manipulation along said latter wall and co-operating means associated with the slidable jaw and the fixed jaw for positively determining their tape holding positions.

3. A portable dispensing device for a roll of adhesive tape, comprising a housing having opposed end walls and an outer peripheral wall with a tape dispensing opening, means for supporting the tape roll in said housing for rotation about an axis extending between said end walls, a first jaw fixed to said housing on one side of the path of tape travel through said opening, a second jaw mounted in said housing on the inner side of said peripheral housing and on the opposite side of said tape path, one of said jaws having a tape severing blade extending substantially radially inwardly of the housing and transversely of said tape path and terminating in a tape severing edge within the confines of the general contour of the peripheral wall, the other jaw having a table section of substantial length in said housing on the radially inner side of said blade facing substantially radially outwardly and inclined in a direction to wedge the tape between said table section and said edge in tape severing position of said jaws, means supporting one of said jaws for slide movement along said peripheral wall towards and away from the other jaw, to bring said table section close to said tape severing edge in position to lay a substantial length of tape along said table section with its adhesive face in contact with said table section and to hold the payed out section of the tape against lengthwise movement while it is being severed by said blade, and co-operating means associated with the slidable jaw and the fixed jaw for predetermining their tape holding positions when the sliding jaw has been moved to the tape severing position.

4. A dispensing device for a tape pack comprising means for supporting the tape pack in dispensing position, a tape tearing edge member, a tape holding member cooperating therewith to hold the tape against endwise movement while it is being torn along the tearing edge of said first mentioned member, one of said members being slidable towards the other member into tape holding position, and releasable means for locking the slidable member against movement away from the other member automatically when said slidable member reaches said tape holding position.

5. A dispensing device for a tape pack comprising means for supporting the tape pack in dispensing position, a tape tearing edge member, a tape holding member cooperating therewith to hold the tape against endwise movement while it is being torn along the tearing edge of said first mentioned member, one of said members being slidable towards the other member into tape holding position, a thumb piece connected to said slidable member for slide manipulation of said slidable member, and a locking device on said thumb piece operable to lock said slidable member against movement away from the other member automatically when said slidable member reaches said tape holding position and releasable by manipulation of said thumb piece.

6. A dispensing device for a tape pack comprising means for supporting the tape pack in dispensing position, a fixed table member on which the tape is adapted to lie as it is pulled from said pack, a member slidable towards and away from said fixed table member and having a tear edge adapted to ride along said table member as said slidable member is moved towards said fixed member and to clamp the tape against said table member, and hand releasable means for locking said slidable member against movement away from said table member automatically when said slidable member reaches said table member, to permit the pulling of the tape along said tear edge against the holding action of said locking means.

7. A dispensing device for a tape pack comprising a frame for supporting a tape pack, a pair of opposed tape holding members on said frame defining therebetween a discharge mouth, means on said frame supporting one of said members for movement away from the other member into inactive position and towards said other member into tape holding position, and a spring latch associated with said movable member for locking said movable member automatically against movement towards said inactive position, when said movable member reaches said tape holding position.

8. A dispensing device for a tape pack comprising a frame for supporting a tape pack, a pair of opposed tape holding members on said frame defining therebetween a discharge mouth, means on said frame supporting one of said members for movement away from the other member into inactive position and towards said other member into tape holding position, a finger piece secured to said movable member and movable therewith along a wall of said housing, said wall having a latch engaging conformation, a latch piece connected to said thumb piece for movement therewith along said housing, and spring means urging said thumb piece in tilted position to press said latch piece against said wall, said latch engaging wall conformation being located in position to cause said latch to snap automatically into said wall conformation, when said movable member reaches tape holding position, and to lock thereby said movable member against movement towards said inactive position, said latch piece being movable out of engagement with said wall conformation by application of finger pressure to said finger piece.

9. A dispensing device for a tape roll comprising a housing for said roll having a peripheral wall, a pair of opposed holding members on said housing defining therebetween a discharge mouth, and means on said frame supporting one of said members for movement along said peripheral wall away from the other member into inactive position and towards said other member into tape holding position, and comprising a spring plate slidable along the inner face of said peripheral wall, a thumb piece on the outside of said peripheral wall and a fastening member between said spring plate and said thumb piece extending through said wall, said thumb piece having a latch piece pressed against said wall by said spring plate, said wall having a slot for engaging said latch piece, said slot being located to cause said latch piece to snap thereinto when said movable member reaches tape holding position to lock said movable member against movement towards inactive position, said thumb piece being tiltable against the action of said spring plate to permit said latch piece to be moved out of said slot by finger pressure on said thumb piece.

10. A portable dispensing device for an adhesive tape roll, comprising a housing for the roll having end walls and an outer peripheral wall provided with a discharge opening for the section of the tape to be dispensed, means for supporting the roll in said housing for rotation, a jaw supported on said housing for slide movement along said opening towards and away from a fixed jaw presented by said outer peripheral wall to open and close said opening and to hold said tape section therebetween in the closed position of the jaws, one of said jaws having a blade extending inwardly towards the interior of said housing and terminating at its inner end within the general outline of said peripheral wall in an edge along which the tape is adapted to be severed in the tape holding position of said jaw, and the other jaw having a tape holding surface likewise extending inwardly toward the interior of said housing and at an angle opposed to that of the blade and located within said housing on the inner side of and near the edge of said blade when said discharge opening is closed, and co-operable arresting devices presented by the housing and the sliding jaw for positively stopping the sliding movement of the sliding jaw in its tape holding position.

11. A portable dispensing device for an adhesive tape roll comprising a housing having opposed end walls and an outer peripheral wall all relatively fixed with respect to each other when a roll of tape for dispensing is supported within the housing, means for supporting a tape roll in said housing for rotation about an axis perpendicular to said end walls, a tape dispensing opening in the outer peripheral wall of the housing through which the tape passes as it is unreeled during a dispensing operation, a closing member for the tape dispensing opening operable by a finger of the hand holding the dispensing device and arranged for sliding movement between a closed position denying access to the tape within the housing and an open position permitting withdrawal of the tape through the discharge opening, means presented by the housing structure for guiding the closing member in its sliding movement, co-operable arresting devices presented by the housing and by the closing member for positively predetermining the closed position of said member, means for holding the closing member in its closed position, and a tape tearing edge located adjacent the discharge opening and in close proximity to a withdrawn portion of tape when the closing member is in closed position, said closing member and the housing at the end of the discharge opening co-operating when said member is in closed position to hold the tape against endwise movement while it is being torn along the tearing edge.

12. A portable dispensing device for an adhesive tape roll according to claim 11 wherein the co-operation of the arresting devices serves to locate the tearing edge in operative position.

13. A portable dispensing device for an adhesive tape roll, according to claim 11 wherein the tearing edge is carried by the closing member.

14. A portable dispensing device for an adhesive tape roll according to claim 11 wherein adjacent the tearing edge when the closing member is in closed position, there is located an anchoring surface in advance of the cutting edge and to which the tape adheres when the withdrawn portion thereof is being torn along the tearing edge.

15. A portable dispensing device for an adhesive tape roll according to claim 14 wherein a depression located adjacent the position of the tape end which remains on the anchoring surface after a dispensed portion of tape has been severed facilitates the removal of said end portion of the tape from the anchoring surface preparatory to dispensing the next portion of tape.

References Cited in the file of this patent

UNITED STATES PATENTS

| Number | Name | Date |
|---|---|---|
| 1,026,778 | Toles | May 21, 1912 |
| 1,210,546 | Schulz | Jan. 2, 1917 |
| 1,729,432 | Anderson | Sept. 24, 1929 |
| 2,080,052 | Lemaster | May 11, 1937 |
| 2,250,774 | Piller | July 29, 1941 |
| 2,447,519 | Marinsky | Aug. 24, 1948 |
| 2,547,569 | Erhardt | Apr. 3, 1951 |